US012606493B2

(12) United States Patent
Gasgnier et al.

(10) Patent No.: US 12,606,493 B2
(45) Date of Patent: Apr. 21, 2026

(54) CERAMIC PASTE COMPOSITIONS FOR 3D PRINTING

(71) Applicant: IMERTECH SAS, Paris (FR)

(72) Inventors: Gilles Gasgnier, Isle (FR); Aure Arcondeguy-Bach, Couzeic (FR)

(73) Assignee: IMERTECH SAS, Paris (FR)

( * ) Notice: Subject to any disclaimer, the term of this patent is extended or adjusted under 35 U.S.C. 154(b) by 1136 days.

(21) Appl. No.: 17/295,911

(22) PCT Filed: Nov. 18, 2019

(86) PCT No.: PCT/EP2019/081653
§ 371 (c)(1),
(2) Date: May 21, 2021

(87) PCT Pub. No.: WO2020/104374
PCT Pub. Date: May 28, 2020

(65) Prior Publication Data
US 2022/0024823 A1 Jan. 27, 2022

(30) Foreign Application Priority Data

Nov. 21, 2018 (EP) ..................................... 18306534

(51) Int. Cl.
| | |
|---|---|
| *C04B 35/626* | (2006.01) |
| *B28B 1/00* | (2006.01) |
| *B33Y 70/00* | (2020.01) |
| *B33Y 10/00* | (2015.01) |

(52) U.S. Cl.
CPC .......... *C04B 35/6263* (2013.01); *B28B 1/001* (2013.01); *B33Y 70/00* (2014.12); *B33Y 10/00* (2014.12); *C04B 2235/3427* (2013.01); *C04B 2235/349* (2013.01); *C04B 2235/5427* (2013.01); *C04B 2235/5436* (2013.01); *C04B 2235/6026* (2013.01)

(58) Field of Classification Search
CPC ........ C04B 35/6263; C04B 2235/3427; C04B 2235/349; C04B 2235/5427; C04B 2235/5436; C04B 2235/6026; B28B 1/001; B33Y 70/00; B33Y 10/00
See application file for complete search history.

(56) References Cited

U.S. PATENT DOCUMENTS

| | | | |
|---|---|---|---|
| 4,189,327 A | 2/1980 | Winchester, Jr. | |
| 2015/0274601 A1* | 10/2015 | Zhang | C04B 35/6263 |
| | | | 501/141 |

FOREIGN PATENT DOCUMENTS

| | | | |
|---|---|---|---|
| CN | 1629100 A * | 6/2005 | |
| WO | WO-2010-141000 A1 | 12/2010 | |
| WO | WO-2011-150038 A1 | 12/2011 | |
| WO | 2018204620 A1 | 11/2018 | |
| WO | 2020206150 A1 | 10/2020 | |

OTHER PUBLICATIONS

CN-1629100-A machine translation via Google Patents (Year: 2005).*
CN-1629100-A machine translation via EspaceNet (Year: 2005).*
https://xinliabrasive.en.made-in-china.com/product/XFKtbGVxapaY/China-Brown-Fused-Alumina-Aluminium-Oxide-Corundum-Powder-Abrasives-for-Sandblasting-and-Abrasive-Tools-Bfa.html#:~:text=Brown%20corundum%20micro%20powder%20is,for%20abrasive%20and%20refractory%20applications. accessed Oct. 28, 2024 (Year: 2024).*
International Search Report issued Feb. 13, 2020, in International Application No. PCT/EP2019/081653.

* cited by examiner

*Primary Examiner* — Cameron K Miller
(74) *Attorney, Agent, or Firm* — Finnegan, Henderson, Farabow, Garrett & Dunner, LLP

(57) ABSTRACT

The present invention relates to a ceramic paste composition comprising a matrix and water, wherein the matrix comprises, based on the total weight of the matrix: about 98 wt % to about 100 wt % of minerals of which at least 30 wt % are phyllosilicates and less than about 2 wt % organic additive; and wherein water is present from about 18 wt % to about 28 wt % based on the total weight of the ceramic paste composition. The present invention also relates to a method of forming a 3D structure using the ceramic paste composition of the invention.

19 Claims, No Drawings

CERAMIC PASTE COMPOSITIONS FOR 3D PRINTING

CLAIM FOR PRIORITY

This application is a U.S. national phase entry under 35 U.S.C. § 371 from PCT International Application No. PCT/EP2019/081653, filed Nov. 18, 2019, which claims the benefit of priority of European Patent Application No. 18306534.1, filed Nov. 21, 2018, from both of which this application claims priority and both of which are incorporated herein by reference.

FIELD OF THE INVENTION

The present invention is directed to ceramic paste composition and uses thereof in 3D printing. The present invention is also directed to 3D ceramic structures obtained by 3D printing the ceramic paste compositions of the present invention.

BACKGROUND OF THE INVENTION

Ceramic articles such as tiles, tableware, sanitaryware, technical pieces and kiln furniture are widely produced using standard forming processes such as casting, extrusion, injection molding, pressing and jiggering. In recent years, 3D printing, also known as additive manufacturing (AM), has been increasingly used in the production of ceramic articles. AM involves the building up of parts by a layer-by-layer process. Many AM processes may be used to print ceramic articles, such as inkjet printing, aerosol jet printing, fused deposition of ceramics, robocasting, paste deposition modelling (PDM), directed energy deposition, laminated object manufacturing (LOM), binder jetting, selective laser melting (SLM), stereolithography (SLA), selective laser sintering (SLS) and ceramic laser gelling (CLG). An advantage of these methods is that a product with a relatively high level of detail can be formed in a relatively fast and cost effective manner.

Paste deposition modelling (PDM), for example, involves the extrusion of a ceramic paste to form an article, which is subsequently dried and fired to consolidate the final article. Widely used ceramic pastes comprise a mineral or a ceramic powder, binding agent and solvent. The use of ceramic pastes in PDM poses many challenges. For example, when using a ceramic powder, the resulting ceramic paste may have rheological properties that are incompatible with the PDM process, such as too high or too low viscosity under shear stress, poor build-up at rest, shear-thickening behaviour instead of shear-thinning and high solvent content. For example, some ceramic pastes may result in blockage of the extrusion nozzle or the formation of an extruded product with poor post-strengthening. There are also disadvantages of using high amounts of binding agent, such as organic additives. The use of high amounts of binding agents lead to higher formulation cost and the need for a higher amount of solvent, which may have consequences on drying and/or firing shrinkage. Binding agents may also burn during firing, leading to carbon dioxide formation and therefore have an adverse environmental impact.

It is therefore desirable to provide alternative or improved ceramic pastes for use in AM methods such as PDM.

SUMMARY OF THE INVENTION

The present invention is defined in the appended claims.

In accordance with a first aspect, there is provided a ceramic paste composition comprising a matrix and water, wherein the matrix comprises, based on the total dry weight of the matrix:
  about 98 wt % to about 100 wt % of minerals of which at least 30 wt % are phyllosilicates; and
  less than about 2 wt % organic additive;
and wherein water is present from about 18 wt % to about 28 wt % based on the total weight of the ceramic paste composition.

In accordance with a second aspect, there is provided a method of forming a 3D structure using the ceramic paste composition of the first aspect.

In accordance with a third aspect, there is provided a 3D ceramic structure obtainable by the method of the third aspect.

Certain embodiments of the present invention may provide one or more of the following advantages:
  desired rheological properties of the ceramic paste composition;
  desired variation of viscosity of the ceramic paste composition at low shear rate and high shear rate;
  desired ease of printing a 3D ceramic structure;
  desired structural integrity of the 3D ceramic structure;
  desired flexibility in the design of the 3D ceramic structure;
  desired customisation of the 3D ceramic structure;
  desired flexibility in the ceramic materials used;
  desired cost.

The details, examples and preferences provided in relation to any particular one or more of the stated aspects of the present invention apply equally to all aspects of the present invention. Any combination of the embodiments, examples and preferences described herein in all possible variations thereof is encompassed by the present invention unless otherwise indicated herein, or otherwise clearly contradicted by context.

DETAILED DESCRIPTION

The present invention is based on the surprising finding that ceramic pastes comprising a very high mineral content and low organic additive content are highly suitable for AM methods such as PDM.

The matrix of the present paste compositions refers to the dry mineral mixture. The matrix of the present ceramic paste compositions comprises about 98.0 wt % minerals of which at least 30 wt % are phyllosilicates, based on the total weight of the matrix. In certain embodiments, the matrix of the present ceramic paste compositions comprises about 98.5 wt % minerals, or about 99.0 wt % minerals, or about 99.5 wt % minerals or about 100 wt % of minerals, based on the total weight of the matrix. In certain embodiments the minerals present in the matrix comprise at least about 30 wt % phyllosilicates, or at least about 32 wt % phyllosilicates, or at least about 35 wt % phyllosilicates, or at least about 37 wt % phyllosilicates, or at least about 40 wt % phyllosilicates, or at least about 42 wt % phyllosilicates, or at least about 45 wt % phyllosilicates, or at least about 47 wt % phyllosilicates, or at least about 50 wt % phyllosilicates, or at least about 52 wt % phyllosilicates, or at least about 55 wt % phyllosilicates.

In certain embodiments, the minerals of the matrix may be selected from kaolinite, illite or montmorillonite and quartz, mica, orthoclase, albite, hematite, goethite, lime, dolomite, anatase, rutile, andalusite, anorthite, cordierite, halloysite, smectite, muscovite, pyrophyllite, talc, diaoyudaoite, zircon, wollastonite, spodumene, nepheline syenite, magnesite, cristobalite, corundum, kyanite, sillimanite, borax, magnesite and combinations thereof.

The phyllosilicates, or lamellar silicates, of the present invention can be sheet silicates. In certain embodiments phyllosilicates may be selected from kaolinite, halloysite, illite, smectite, talc, montmorillonite, muscovite, pyrophyllite and combinations thereof.

In certain embodiments the mean particles size $d_{50}$ of the minerals in the matrix is less than about 100 μm, or less than about 95 μm, or less than about 90 μm, or less than about 85 μm, or less than about 80 μm, or less than about 75 μm, or less than about 70 μm, or less than about 65 μm, or less than about 60 μm, as measured by as measured by laser diffraction. One laser diffraction method is wherein a fully dispersed sample in an aqueous medium is measured using a Partica LA-950V2 machine supplied by Horiba. A CILAS 1190LD may also be used in the laser diffraction method.

The matrix of the ceramic paste composition comprises less than about 2 wt % organic additives, based on the total weight of the matrix. In certain embodiments, the matrix of the ceramic paste composition comprises less than about 1.9 wt % organic additive, or less than about 1.8 wt % organic additive, or less than about 1.7 wt % organic additive, or less than about 1.6 wt % organic additive, or less than about 1.5 wt % organic additive, or less than about 1.4 wt % organic additive, or less than about 1.3 wt % organic additive, or less than about 1.2 wt % organic additive, or less than about 1.0 wt % organic additive, or less than about 0.8 wt % organic additive, or less than about 0.6 wt % organic additive, or less than about 0.4 wt % organic additive, or less than about 0.2 wt % organic additive, based on the total weight of the matrix. In certain embodiments the matrix of the ceramic paste composition is free from organic additives.

In certain embodiments, organic additive may be selected from methyl-cellulose, hydroxypropyl methyl-cellulose, hydroxyethyl methyl-cellulose, ethyl hydroxyethyl-cellulose, hydroxyethyl-cellulose, poly(ethylene oxide) polymer, carboxy-methylcellulose, polyethylenimine, poly(vinyl butyral), poly(ethylene glycol), poly(vinyl alcohol), poly (methacrylic acid), poly(acrylic acid), pectin citrus, *psyllium* husk powder and combinations thereof.

The ceramic paste composition comprises water in an amount from about 18 wt % to about 28 wt % based on the total weight of the ceramic paste composition. In certain embodiments, the amount of water in the ceramic paste composition is from about 20 wt % to about 26 wt %, or from about 22 wt % to about 24 wt % based on the total weight of the ceramic paste composition.

The ceramic paste composition may comprise an aggregate. The aggregate may be selected from kaolin grog, clay grog, mullite, andalusite, sillimanite, kyanite, fused corundum, ground ceramic waste or combinations thereof. In certain embodiments, the mean particle size distribution $d_{50}$ of the aggregate is from about 100 μm to about 500 μm, or from about 105 μm to 480 μm, or from about 110 μm to 450 μm, or from about 115 μm to 420 μm, or from about 120 μm to 400 μm, or from about 125 μm to 350 μm, or from about 130 μm to 320 μm, as measured by laser diffraction. One laser diffraction method is wherein a fully dispersed sample in an aqueous medium is measured using a Partica LA-950V2 machine supplied by Horiba. A CILAS 1190LD may also be used in the laser diffraction method. Alternatively, particle size distribution may be measured using a sieving technique. In one example, sieves supplied by Gantois or Saulas may be used in an ANALYSETTE 3 Pro vibratory sieve shaker supplied by Fritsch. The ANALY- SETTE 3 Pro using an electromagnetic drive to cause the sieves to oscillate in a vertical direction. The material to be sieved is propelled upward off the sieve fabric and forced through the mesh of the attached test sieve as it falls back down. A stack of sieves used to obtain the required particle size distribution may be selected from sieves with holes of: 100 μm, 150 μm, 200 μm, 250 μm, 300 μm, 400 μm and 500 μm.

In certain embodiments, the aggregate may be present in the matrix in an amount up to 50 wt %, or in an amount up to 45 wt %, or in an amount up to 40 wt %, or in an amount up to 35 wt %, or in an amount up to 30 wt %, or in an amount up to 25 wt %, or in an amount up to 20 wt %, or in an amount up to 15 wt %, or in an amount up to 10 wt %, or in an amount up to 5 wt %, based on the based on the total weight of the matrix. In certain embodiments, the matrix and the ceramic paste composition is free of aggregates.

In certain embodiments the ceramic paste composition may have a storage modulus G' of from about 1.0 E+6 Pa to about 4.0 E+6 Pa, or from about 1.3 E+6 Pa to about 3.8 E+6 Pa, or from about 1.5 E+6 Pa to about 3.5 E+6 Pa, or from about 1.8 E+6 Pa to about 3.5 E+6 Pa, or from about 2.0 E+6 Pa to about 3.3 E+6 Pa, or from about 2.3 E+6 Pa to about 3.0 E+6 Pa, or from about 2.5 E+6 Pa to about 2.8 E+6 Pa. In certain embodiments the ceramic paste composition may have a loss modulus G" of from about 1.5 E+5 Pa to about 10.0 E+5 Pa, or from about 2.0 E+5 Pa to about 9.0 E+5 Pa, or from about 2.5 E+5 Pa to about 8.0 E+5 Pa, or from about 3.0 E+5 Pa to about 7.0 E+5 Pa, or from about 3.5 E+5 Pa to about 6.0 E+5 Pa, or from about 4.0 E+5 Pa to about 5.5 E+5 Pa, or from about 4.5 E+5 Pa to about 5.0 E+5 Pa. The storage modulus G' and the loss modulus G" of the ceramic pastes may be measured using an oscillatory rheometer, such as a Modular Compact Rheometer MCR 302 from Anton Paar.

3D Printing

In certain embodiments, the 3D printing method begins with the definition of a three-dimensional geometry using computer-aided design (CAD) software. This CAD data may then be processed with software that slices the model into many thin layers, which are essentially two-dimensional. A physical part may then be created by the successive printing of these layers to recreate the desired geometry.

In one embodiment, the individual layer may be printed by applying a pre-mixed ceramic paste, which may be extruded and is herein known as microextrusion. Microextrusion covers a number of methods including, but not limited to, paste deposition modelling (PDM), pressure-assisted microsyringe, low-temperature deposition manufacturing, 3D bioplotting, robocasting, direct-write assembly and solvent-based extrusion freeforming. These techniques are the most commonly used additive manufacturing techniques that do not involve melting the material. In addition, this microextrusion is often disclosed in the art as fused deposition modelling (FDM). This use of the term "FDM" is not strictly correct as FDM requires melting of the material, which does not occur in microextrusion methods. However, as part of the present invention, the term microextrusion includes FDM as far as FDM is understood not to involve melting of a material.

In certain embodiments, the ceramic mixture is printed onto the ceramic substrate at a rate of from about 1 to about 100 mm/s, or from about 5 to about 95 mm/s, or from about 10 to about 90 mm/s, or from about 15 to about 85 mm/s, or from about 20 to about 80 mm/s, or from about 25 to about 75 mm/s, or from about 35 to about 70 mm/s, or from about 30 to about 65 mm/s, or from about 35 to about 60 mm/s, or from about 40 to about 55 mm/s, or from about 45 to about 50 mm/s.

In certain embodiments the green 3D ceramic structure is dried, dried and sintered, dried and fired, or fired to obtain a 3D ceramic structure.

In certain embodiments, the ceramic paste composition and/or the 3D ceramic structure may have one or more of the following effects:

controlled viscosity at a low shear rate;

controlled viscosity at a high shear rate;

improved ease of printing;

reduced blocking of nozzle during extrusion when printing;

reduced environmental impact of the ceramic paste composition and 3D ceramic structure;

controlled formation of 3D ceramic structure;

detailed formation of 3D ceramic structure;

efficient method of production;

flexible method of production; or cost effective method of production.

For the avoidance of doubt, the present application is directed to subject-matter described in the following numbered paragraphs.

1. A ceramic paste composition comprising a matrix and water, wherein the matrix comprises, based on the total dry weight of the matrix:

about 98 wt % to about 100 wt % of minerals of which at least about 30 wt % are phyllosilicates; and less than about 2 wt % organic additive;

and wherein water is present from about 18 wt % to about 28 wt % based on the total weight of the ceramic paste composition.

2. The ceramic paste composition of numbered paragraph 1, wherein the minerals are selected from kaolinite, illite, halloysite or montmorillonite and quartz, mica, orthoclase, albite, hematite, goethite, lime, dolomite, anatase, rutile, andalusite, anorthite, cordierite, smectite, muscovite, pyrophyllite talc, diaoyudaoite, zircon, wollastonite, spodumene, nepheline syenite, magnesite, cristobalite, corundum, kyanite, sillimanite, borax, magnesite and combinations thereof.

3. The ceramic paste composition of numbered paragraph 1 or numbered paragraph 2, wherein the phyllosilicates are selected from kaolinite, halloysite, illite, smectite, talc, montmorillonite, muscovite, pyrophyllite and combinations thereof.

4. The ceramic paste composition of any one of the preceding numbered paragraphs, wherein the mean particle size distribution $d_{50}$ of the minerals in the matrix is less than about 100 μm.

5. The ceramic paste composition of any one of the preceding numbered paragraphs, wherein the organic additive is selected from methyl-cellulose, hydroxypropyl methyl-cellulose, hydroxyethyl methyl-cellulose, ethyl hydroxyethyl-cellulose, hydroxyethyl-cellulose, poly(ethylene oxide) polymer, carboxy-methylcellulose, polyethylenimine, poly(vinyl butyral), poly(ethylene glycol), poly(vinyl alcohol), poly(methacrylic acid), poly(acrylic acid), pectin citrus, *psyllium* husk powder and combinations thereof.

6. The ceramic paste composition of any one of the preceding numbered paragraphs, wherein the matrix comprises an aggregate.

7. The ceramic paste composition of numbered paragraph 6, wherein the aggregate is selected from kaolin grog, clay grog, mullite, andalusite, sillimanite, kyanite, fused corundum, ground ceramic waste or combinations thereof.

8. The ceramic paste composition of numbered paragraph 6 or numbered paragraph 7, wherein the particle size distribution of the aggregate is from about 100 μm to about 500 μm as determined by sieving or laser diffraction.

9. The ceramic paste composition of any one of numbered paragraph 6 to 8, wherein the aggregate is present in an amount up to about 50 wt % based on the total weight of the matrix.

10. The ceramic paste composition of any one of the preceding numbered paragraphs, wherein the storage modulus G' is between 1.0 E+6 Pa and 4.0 E+6 Pa.

11. The ceramic paste composition of any one of the preceding numbered paragraphs, wherein loss modulus G" is between 1.5 E+5 Pa and 10.0 E+5 Pa.

12. A method of forming a 3D ceramic structure from the ceramic paste composition of numbered paragraphs 1 to 11 using additive manufacturing.

13. The method according to numbered paragraph 12, wherein the additive manufacturing is a microextrusion method.

14. The method of numbered paragraph 13, wherein the microextrusion method is paste deposition modelling.

15. A 3D ceramic structure obtainable by the method of any one of numbered paragraphs 12 to 14.

Examples

Preparation of Ceramic Paste

The dry raw materials as shown in Table 1 were combined to form the matrix. Each of the minerals provided in Table 1 are obtained from a natural source. For example, the clays may be Hyplas 64, Hymod Prima, Hycast VC, RR40, RR32, Hymod Blue, Hymod Exelsior, Hymod Sigma or the like; the kaolins may be Grolleg, Prosper, Pleyber B, Standard Porcelain, super Standard Porcelain, MRD-White or the like; the talcs may be Luzenac 2, Luzenac EC125, Luzenac 00C, Sierralite 2000, or the like; the feldspars may be CM77, EA4S, FT200, KF325 #, ICE10, or the like; and the chamottes may be Clayrac Epurée, Clayrac SHD, Molochite, or the like.

TABLE 1

Dry Matrix Compositions[1]

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 | Comp Ex. 1 | Comp Ex. 2 | Comp Ex. 3 |
|---|---|---|---|---|---|---|---|---|---|---|---|---|---|---|---|---|---|---|---|---|---|
| Clay | 1 | | | | | | | | 4 | 23 | 6 | 6 | 6 | 6 | 16 | 31 | | | 36 | 35.5 | 6.5 |
| | 2 | | | | | | | | | | | | | | | | | | | 0.5 | |
| | 3 | | | | | | | | 3 | | 11 | 11 | 11 | 11 | | 15 | | 16 | | | 21 |
| | 4 | | | | | | | | | 23 | 5 | 5 | 5 | 5 | | | 8.8 | 12 | | | 11 |

TABLE 1-continued

Dry Matrix Compositions[1]

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 | Comp Ex. 1 | Comp Ex. 2 | Comp Ex. 3 |
|---|---|---|---|---|---|---|---|---|---|---|---|---|---|---|---|---|---|---|---|---|---|
| | 5 | 2 | 5 | | | 1 | 1 | | 2 | | 5 | 2 | 2 | | 2 | 2 | | | | | |
| | 6 | | | | | | | | | | | | | | | | 7.9 | | | | |
| | 7 | | | | | | | | | | | | | | | | 7.9 | | | | |
| | 8 | | | | | | | | | | | | | | | | | 28 | | | |
| | 9 | | | 2 | | | | | | | | | | | | | | | | | |
| | 10 | | 7 | | | | | | | | | | | | | | | | | | |
| | 11 | | | | | | 12 | | 31 | | | | | | | | | | | | |
| | 12 | | | | | | 15 | | | | | | | | | | | | | | |
| | 13 | | | | | | 11 | | | | | | | | | | | | | | |
| | 14 | | | | | | 10 | | | | | | | | | | | | | | |
| | 15 | | | | | | 11 | | | | | | | | | | | | | | |
| Kaolin | 1 | | | | | | | | | 3 | 6 | 7 | 8 | 8 | 3 | | | | | | |
| | 2 | | | 3 | 15 | | | 20 | | 1 | 3 | 3.5 | 4 | 3 | | | | | | | |
| | 3 | 26 | | 27 | | 24 | | | | | 8 | 9.5 | 11 | 8 | | | | | | | |
| | 4 | 21 | 39 | 13 | | | | | | | 6 | 7 | 8 | 4 | 18 | | | | | | |
| | 5 | | | | | | | | | 18 | | | | | | 18 | | | 5 | 5 | 5 |
| | 6 | 6 | 9 | | | | | | | | | | | | | | | | | | |
| | 7 | | | 13 | 12 | | | 9 | 12 | | | | | | | | | | | | |
| | 8 | | | | 10 | | | 6 | | | | | | | | | | | | | |
| | 9 | | | | 16 | 30 | | | | | | | | | | | | | | | |
| | 10 | | | | | | | 21 | | | | | | | | | | | | | |
| Talc | 1 | | | | | | | | | | | | | | | 39 | | | | | |
| | 2 | | | | | | | | | | | | | | | | 21 | | | | |
| Chalk | 1 | | | | | | | | | | | | | | | 6 | | | | | |
| | 2 | | | | | | 3 | | | | | | | | | | | | | | |
| Quartz | 1 | | | | | | | | | | | | | | | | | | | | |
| Sand | 2 | | | | | | | | | | | | | | | | 9 | | | | |
| | 3 | | 3 | | | | | | | | | | | | | | | 19 | | | |
| | 4 | 26 | 22 | 24 | | 25 | | | | | | | | | | | | | | | |
| | 5 | | | 5 | | | | | | | | | | | | | | | | | |
| | 6 | | | | 25 | | | 20 | | | | | | | | | | | | | |
| | 7 | | | | | | 25 | | | | | | | | | | | | | | |
| Feldspar | 1 | | | | | | | | | | | | | | | | | | | | |
| | 2 | | | | | | | | | | | | | | | | | | 9 | 9 | 6.5 |
| | 3 | 13 | 11 | 13 | | 10 | | | | | | | | | | | | | | | |
| | 4 | 6 | | | | | | 4 | | | | | | | | | | | | | |
| | 5 | | 4 | | | 10 | | | | | | | | | | | | | | | |
| | 6 | | | | 9 | | | | | | | | | | | | | | | | |
| | 7 | | | 12 | | | | 18 | | | | | | | | | | | | | |
| Chamotte | 1 | | | | | | | | | 12 | | | | | | | 16.5 | | | | |
| | 2 | | | | | | | | | 38 | | | | | | | | | | | |
| | 3 | | | | | | | | | | | | | | | | 16.5 | | | | |
| | 4 | | | | | | | | | | | | | | | | 17 | | | | |
| | 5 | | | | | | | | | | | | | | | | | 25 | | | |
| | 6 | | | | | | 13 | | | | | | | | | | | | | | |
| | 7 | | | | | | | | 27 | | | | | | | | | | | | |
| Alumine | 1 | | | | | | | | | | 45 | 41 | | 37 | 45 | | 4.4 | | 50 | 50 | 50 |

[1]values given as a weight percentage based on the total weight of the dry matrix The XRD spectra of each sample of Table 1 was measured using a Bruker D8 advance and the software Diffrac.Eva. The relative amount of phyllosilicates in each sample was determined as shown in Table 2, wherein a specific amount of an internal standard was added to the sample to aid analysis.

TABLE 2

Total weight of phyllosilicates in the matrix[1]

| | Kaolinite | Muscovite | Talc | Smectite 15A | Pyrophyllite | Total Phyllosilicates (weight %) |
|---|---|---|---|---|---|---|
| Ex. 1 | 47 | 6 | — | — | — | 53 |
| Ex. 2 | 48 | 5 | — | 1.5 | — | 54.5 |
| Ex. 3 | 50 | 5 | — | 0.4 | — | 55.4 |
| Ex. 4 | 44 | 4 | — | — | 1.4 | 49.4 |
| Ex. 5 | 43 | 7 | — | — | — | 50 |
| Ex. 6 | 37 | 19 | — | — | — | 56 |
| Ex. 7 | 47 | 4 | — | — | — | 51 |
| Ex. 8 | 39 | 15 | — | — | — | 54 |

TABLE 2-continued

| | Total weight of phyllosilicates in the matrix[1] | | | | | |
| --- | --- | --- | --- | --- | --- | --- |
| | Kaolinite | Muscovite | Talc | Smectite 15A | Pyrophyllite | Total Phyllosilicates (weight %) |
| Ex. 9 | 30 | 7 | — | — | — | 37 |
| Ex. 10 | 40 | 8 | — | 0.2 | — | 48 |
| Ex. 11 | 35 | 8 | — | 0.2 | — | 43 |
| Ex. 12 | 39 | 9 | — | 0.3 | — | 48 |
| Ex. 13 | 35 | 7 | — | 0.1 | — | 42 |
| Ex. 14 | 38 | 3 | — | — | — | 42 |
| Ex. 15 | 35 | 4 | 24.7 | — | — | 63.7 |
| Ex. 16 | 17 | — | 14 | — | — | 31 |
| Ex. 17 | 29 | 16 | — | — | — | 45 |
| Comp Ex. 1 | 20 | 8 | — | — | — | 28 |
| Comp Ex. 2 | 21 | 8 | — | — | — | 29 |
| Comp Ex. 3 | 21 | 8 | — | — | — | 29 |

[1]values given as a weight percentage based on the total weight of the dry matrix The matrix was then ground together with water in an amount shown in Table 3 in a ball mill for 7 to 11 hours or simply mixed together in a tank until the amount of particles larger than 90 microns by sieving is less than about 0.5% by weight. The resulting slurry was then filter-pressed to form a cake. In a further step the filter-pressed cake was processed with a Z-blade with the addition of water. The ceramic paste was extruded under vacuum before being used for 3D printing. The storage modulus G' and loss modulus G" were then measured by using an oscillatory rheometer, such as a Modular Compact Rheometer MCR 302 from Anton Paar, as shown in Table 3.

TABLE 3

| | Total water content in the paste compositions | | |
| --- | --- | --- | --- |
| | water content (wt %)[1] | Storage modulus G' | Loss modulus G" |
| Ex. 1 | 24.1 | 3.17E+06 | 8.68E+05 |
| Ex. 2 | 26.8 | 2.12E+06 | 4.03E+05 |
| Ex. 3 | 25.0 | 3.02E+06 | 4.95E+05 |
| Ex. 4 | 24.2 | 2.05E+06 | 3.62E+05 |
| Ex. 5 | 25.0 | 3.03E+06 | 4.76E+05 |
| Ex. 6 | 26.1 | 2.20E+06 | 3.50E+05 |
| Ex. 7 | 25.6 | 2.66E+06 | 4.85E+05 |
| Ex. 8 | 23.2 | 3.13E+06 | 5.06E+05 |
| Ex. 9 | 19.7 | 1.07E+06 | 1.97E+05 |
| Ex. 10 | 22.2 | 3.65E+06 | 7.51E+05 |
| Ex. 11 | 22.3 | 2.82E+06 | 5.03E+05 |
| Ex. 12 | 22.8 | 3.52E+06 | 6.10E+05 |
| Ex. 13 | 22.3 | 2.36E+06 | 5.14E+05 |
| Ex. 14 | 23.3 | 2.86E+06 | 4.43E+05 |
| Ex. 15 | 23.9 | 2.06E+06 | 3.69E+05 |
| Ex. 16 | 20.4 | 3.28E+06 | 5.68E+05 |
| Ex. 17 | 20.7 | 2.80E+06 | 1.53E+06 |
| Comp Ex. 1 | 19.1 | 1.63E+06 | 4.04E+05 |
| Comp Ex. 2 | 19.5 | 1.96E+06 | 5.05E+05 |
| Comp Ex. 3 | 21.3 | 3.41E+06 | 5.58E+05 |

[1]weight percentage based on the total weight of the ceramic paste

Printing of the 3D Ceramic Structure

The ceramic paste was prepared as described above and printed using a Delta 4070 3d printer from Wasp with a 1 to 1.5 mm nozzle at a speed of 25 mm/s to 50 mm/s.

Drying the Green 3D Ceramic Structure

After printing was complete, the green 3D structure was dried at room temperature for 15 to 24 hours until the green 3D structure can be removed from the printing slab, then at 70° C. for 24 hours.

Firing of Dried 3D Structure

The dried 3D structures as described above were then fired at conditions appropriate for the type of paste. For example, for sanitaryware compositions the structures were fired at 1240° C. in an oxidizing atmosphere, for hard porcelain compositions the structures were fired at 1370° C. in a reducing atmosphere, for stoneware the compositions were fired at 1280° C. in an oxidizing atmosphere.

The printability of each ceramic paste was tested using an LDM Delta WASP (LDM=liquid deposition modeling) extruder and the results are shown in Table 4. The printing parameters were adjusting until a setting was found where the ceramic paste was printable. The parameters adjusted include: input pressure, screw speed of the microextruder, nozzle diameter, printing speed (of print head), scanning step distance, flowrate of feedstock, printing pattern. After adjustment of the parameters, some ceramics were still not printable. As seen in Table 4, comparative examples Comp.Ex.1, Comp.Ex.2 and Comp.Ex.3 were found not to be printable, whereas the compositions according to the invention (Ex.1 to Ex.17) were found to be printable.

TABLE 4

| Printability | |
| --- | --- |
| | Printability |
| Ex. 1 | Yes |
| Ex. 2 | Yes |
| Ex. 3 | Yes |
| Ex. 4 | Yes |
| Ex. 5 | Yes |
| Ex. 6 | Yes |
| Ex. 7 | Yes |
| Ex. 8 | Yes |
| Ex. 9 | Yes |
| Ex. 10 | Yes |
| Ex. 11 | Yes |
| Ex. 12 | Yes |
| Ex. 13 | Yes |
| Ex. 14 | Yes |
| Ex. 15 | Yes |
| Ex. 16 | Yes |
| Ex. 17 | Yes |
| Comp Ex. 1 | No |
| Comp Ex. 2 | No |
| Comp Ex. 3 | No |

The invention claimed is:

1. A 3D printable ceramic paste composition comprising a matrix and water, wherein the matrix comprises, based on the total dry weight of the matrix:

about 98 wt % to about 100 wt % of at least two minerals wherein at least 30 wt % of the at least two minerals are phyllosilicates;

less than about 2 wt % of an organic additive; and the at least two minerals comprise kaolinite and at least one additional mineral;

and wherein water is present from about 20 wt % to about 28 wt % based on the total weight of the ceramic paste composition.

2. The 3D printable ceramic paste composition of claim 1, wherein the at least one additional mineral is selected from illite, halloysite, montmorillonite, quartz, mica, orthoclase, albite, hematite, goethite, lime, dolomite, anatase, rutile, andalusite, anorthite, cordierite, smectite, muscovite, pyrophyllite, talc, diaoyudaoite, zircon, wollastonite, spodumene, nepheline syenite, magnesite, cristobalite, corundum, kyanite, sillimanite, borax, and magnesite.

3. The 3D printable ceramic paste composition of claim 1, wherein the phyllosilicates are selected from halloysite, illite, smectite, talc, montmorillonite, muscovite, pyrophyllite, and combinations thereof.

4. The 3D printable ceramic paste composition of claim 1, wherein the mean particle size distribution $d_{50}$ of the at least two minerals in the matrix is less than about 100 μm.

5. The 3D printable ceramic paste composition of claim 1, wherein the organic additive is selected from methyl-cellulose, hydroxypropyl methyl-cellulose, hydroxyethyl methyl-cellulose, ethyl hydroxyethyl-cellulose, hydroxyethyl-cellulose, poly(ethylene oxide) polymer, carboxy-methylcellulose, polyethylenimine, poly(vinyl butyral), poly(ethylene glycol), poly(vinyl alcohol), poly(methacrylic acid), poly(acrylic acid), pectin citrus, *psyllium* husk powder, and combinations thereof.

6. The 3D printable ceramic paste composition of claim 1, wherein the composition comprises an aggregate.

7. The 3D printable ceramic paste composition of claim 6, wherein the aggregate is selected from kaolin grog, clay grog, mullite, andalusite, sillimanite, kyanite, fused corundum, ground ceramic waste, and combinations thereof.

8. The 3D printable ceramic paste composition of claim 6, wherein the particle size distribution of the aggregate is from about 100 μm to about 500 μm.

9. The 3D printable ceramic paste composition of claim 8, wherein the aggregate is present in an amount up to about 50 wt % based on the total weight of the matrix.

10. The 3D printable ceramic paste composition of claim 1, wherein the storage modulus G' of the 3D printable ceramic paste composition is between 1.0 E+6 Pa and 4.0 E+6 Pa.

11. The 3D printable ceramic paste composition of claim 1, wherein loss modulus G" of the 3D printable ceramic paste composition is between 1.5 E+5 Pa and 10.0 E+5 Pa.

12. A method of forming a 3D ceramic structure from the 3D printable ceramic paste composition of claim 1 using additive manufacturing.

13. The method according to claim 12, wherein the additive manufacturing is a microextrusion method.

14. The method of claim 13, wherein the microextrusion method is paste deposition modelling.

15. The 3D printable ceramic paste composition of claim 7, wherein the particle size distribution of the aggregate is from about 100 μm to about 500 μm.

16. The 3D printable ceramic paste composition of claim 15, wherein the aggregate is present in an amount up to about 50 wt % based on the total weight of the matrix.

17. The 3D printable ceramic paste composition of claim 2, wherein:

the phyllosilicates are selected from halloysite, illite, smectite, talc, montmorillonite, muscovite, pyrophyllite, and combinations thereof; and the organic additive is selected from methyl-cellulose, hydroxypropyl methyl-cellulose, hydroxyethyl methyl-cellulose, ethyl hydroxyethyl-cellulose, hydroxyethyl-cellulose, poly(ethylene oxide) polymer, carboxy-methylcellulose, polyethylenimine, poly(vinyl butyral), poly(ethylene glycol), poly(vinyl alcohol), poly(methacrylic acid), poly(acrylic acid), pectin citrus, *psyllium* husk powder, and combinations thereof.

18. The 3D printable ceramic paste composition of claim 17, wherein the mean particle size distribution $d_{50}$ of the at least two minerals in the matrix is less than about 100 μm.

19. The 3D printable ceramic paste composition of claim 18, wherein 30 wt % to 55 wt % of the at least two minerals are phyllosilicates.

* * * * *